US010055599B2

(12) United States Patent
Depinay

(10) Patent No.: US 10,055,599 B2
(45) Date of Patent: Aug. 21, 2018

(54) PROCESSING METHOD FOR MAKING ELECTRONIC DOCUMENTS SECURE

(71) Applicant: IDEMIA FRANCE, Colombes (FR)

(72) Inventor: Jean-Loup Depinay, Colombes (FR)

(73) Assignee: IDEMIA FRANCE, Colombes (FR)

( * ) Notice: Subject to any disclaimer, the term of this patent is extended or adjusted under 35 U.S.C. 154(b) by 8 days.

(21) Appl. No.: 14/557,635

(22) Filed: Dec. 2, 2014

(65) Prior Publication Data

US 2015/0154416 A1 Jun. 4, 2015

(30) Foreign Application Priority Data

Dec. 2, 2013 (FR) ...................................... 13 61958

(51) Int. Cl.
| | |
|---|---|
| *G06F 21/62* | (2013.01) |
| *H04L 29/06* | (2006.01) |
| *G06F 21/31* | (2013.01) |
| *G06F 21/53* | (2013.01) |
| *G09C 5/00* | (2006.01) |

(52) U.S. Cl.
CPC .......... *G06F 21/6209* (2013.01); *G06F 21/31* (2013.01); *G06F 21/53* (2013.01); *G06F 21/6245* (2013.01); *G09C 5/00* (2013.01); *H04L 63/0428* (2013.01); *H04L 63/0853* (2013.01)

(58) Field of Classification Search
CPC ...... G06F 21/6209; G06F 21/60; G06F 21/62; G06F 21/6218; G06F 21/6245; G09C 5/00; H04L 63/0428; H04L 63/0853
See application file for complete search history.

(56) References Cited

U.S. PATENT DOCUMENTS

| | | | |
|---|---|---|---|
| 6,941,454 B1 * | 9/2005 | Spraggs ................ | G06F 21/606 380/282 |
| 8,776,249 B1 * | 7/2014 | Margolin .............. | G06F 21/606 380/277 |
| 8,850,181 B2 * | 9/2014 | Black ....................... | G07F 7/00 713/150 |

(Continued)

OTHER PUBLICATIONS

Search Report dated Jul. 30, 2014 from French Patent Application No. 1361958, pp. 1-2.

(Continued)

*Primary Examiner* — Hadi S Armouche
*Assistant Examiner* — Alexander R Lapian
(74) *Attorney, Agent, or Firm* — MH2 TECHNOLOGY LAW GROUP, LLP

(57) ABSTRACT

Disclosed are systems and processing methods that may be performed by first, second, and third processor units to give access to an item of sensitive text data from a secure electronic document. In various implementations, the systems and methods may perform operations that include obtaining the secure electronic document; triggering the display of the secure document on a first terminal; selecting at least one marker contained in the secure document; determining secure data; and on the basis of said secure data, determining the item of sensitive text data. In various implementations, the third unit may trigger the display of the item of sensitive text data, and the second and third processor units may be distinct from the first unit and may execute an operating system that is independent of the operating system of the first processor unit.

12 Claims, 10 Drawing Sheets

(56) References Cited

U.S. PATENT DOCUMENTS

| | | | |
|---|---|---|---|
| 8,873,744 B2* | 10/2014 | Inami | G06F 21/608 380/212 |
| 2006/0005017 A1* | 1/2006 | Black | H04L 63/0428 713/165 |
| 2007/0067211 A1* | 3/2007 | Kaplan | G06Q 10/04 705/7.31 |
| 2009/0249457 A1* | 10/2009 | Graff | G06F 21/33 726/6 |
| 2011/0072355 A1* | 3/2011 | Carter | G06F 21/84 715/738 |
| 2011/0081949 A1* | 4/2011 | Natarajan | H04W 4/001 455/557 |
| 2011/0270751 A1 | 11/2011 | Csinger et al. | |
| 2012/0284782 A1* | 11/2012 | Karim | G09C 5/00 726/6 |
| 2013/0141471 A1* | 6/2013 | Batson | G09G 5/00 345/690 |
| 2013/0179985 A1 | 7/2013 | Strassmann et al. | |
| 2013/0266141 A1 | 10/2013 | Kim et al. | |
| 2013/0272523 A1* | 10/2013 | McCorkindale | H04N 1/44 380/243 |
| 2013/0290716 A1* | 10/2013 | Gavrilov | H04L 63/0272 713/168 |
| 2014/0201527 A1* | 7/2014 | Krivorot | G06F 21/6209 713/168 |
| 2015/0016602 A1* | 1/2015 | de los Reyes | G06F 21/00 380/28 |
| 2015/0149776 A1* | 5/2015 | Chastain | H04L 63/0869 713/169 |

OTHER PUBLICATIONS

Author Unknown, "The Trusted Execution Environment: Delivering Enhanced Security at a Lower Cost to the Mobile Market," Internet White Paper, Feb. 2011, pp. 1-26; retrieved from << https://www.globalplatform.org/documents/GlobalPlatform_TEE_White_Paper_Feb2011.pdf >>.

* cited by examiner

PROCESSING METHOD FOR MAKING ELECTRONIC DOCUMENTS SECURE

REFERENCE TO RELATED APPLICATIONS

This application claims priority to French Application No. 1361958 filed Dec. 2, 2013, the entire disclosure of which is hereby incorporated by reference in its entirety.

BACKGROUND OF THE INVENTION

The present invention relates to making electronic documents secure, and more particularly it relates to providing secure access to sensitive text data by means of a trusted processor unit.

In everyday life or in a professional context, for example, it frequently happens that documents are involved in which the content is sensitive and therefore needs a certain level of security. This may apply for example to a confidential document such as a contract containing sensitive information (the names of parties, sums of money, special clauses, . . . ) to which the parties involved desire to protect access.

FIG. 1 shows an example of a user 4 using a terminal 2 to access an electronic document 6 (e.g. of Word™ or PDF™ type) contained in a file F1. Consideration is given in this example to such a document 6 containing conventional text data 8 that does not need any particular protection, and "sensitive" text data 10 that the creator of the document considers to be sensitive.

In known manner, the level of security to which the document 6 benefits while it is being viewed by the user 4 depends in particular on the degree of trust that can be given to the terminal 2 in use. Very often terminals (computers, tablets, etc.) are exposed to security risks, in particular to risks of intrusion or of infections by malware (viruses, monitoring devices, . . . ), that are difficult to control. If the terminal 2 is not a trusted terminal, then access to the document 6 and most particularly to the sensitive data 10 via the terminal 2 thus presents risks in terms of security.

It is not always possible for the user 4 to know the level of trust that can be given to the terminal 2 in use, nor the level of trust that is required to be able to access the data in the text 8 in complete security. It is also not always possible for the user 4 to know whether the document 6 to which he/she seeks to gain access contains information that is sensitive, and if so where that information appears in the document 6 in question.

At present there is no solution that makes it possible to respond effectively to these problems. There already exist various encryption solutions that make it possible for sensitive electronic documents to be protected by being encrypted. Nevertheless, such solutions are often not ergonomic for a user and they do not always provide a satisfactory level of security.

There thus exists a need for a solution that makes it possible to secure access to sensitive text data in order in particular to reduce any risk of non-authorized access to the sensitive data in question. In particular, it is necessary to provide more effective protection for accessing sensitive text data (e.g. contained in an electronic document) even while using a terminal that benefits from a level of trust or security that is poor.

OBJECT AND SUMMARY OF THE INVENTION

To this end, the present invention provides a processing method performed by a system comprising a first processor unit in a first terminal, a second processor unit, and a third processor unit, to enable a user to access sensitive text data from a secure electronic document, the method comprising:

a) the first processor unit obtaining the secure electronic document;

b) the first processor unit triggering the display of the secure electronic document on the first terminal;

c) the user selecting at least one marker contained in said secure document and viewable by the user on the display;

d) on the basis of said selected marker, determining secure data from which it is possible to recover at least one item of sensitive text data;

e) the second processor unit obtaining said secure data;

f) the second processor unit determining said at least one item of sensitive text data for viewing from said secure data;

g) the third processor unit obtaining said at least one item of sensitive text data; and h) the third processor unit triggering the display of said at least one item of sensitive text data;

wherein said second and third processor units are distinct from the first processor unit and each of them executes an operating system that is independent from the operating system of the first processor unit.

The invention finds a particular application when the first processor unit presents risks in terms of security or at least does not offer a satisfactory level of trust for allowing access to items of text data (or text data strings) of sensitive nature. Accessing the sensitive text data by means of a trusted and independent processor unit, namely the third unit in the invention, advantageously makes it possible to be unaffected by any security risks that might be associated with the first processor unit.

In a particular implementation, during the obtaining step a), the first processor unit receives the secure electronic document from outside said first terminal. Alternatively, the secure document may be recovered from a memory of the first terminal.

In a particular implementation, the secure data is stored in the secure document in association with said marker, and the determination step d) comprises recovering the secure data from the secure electronic document on the basis of said marker.

In a particular implementation, the secure data is the marker. Under such circumstances, the marker may for example be a code or an identifier.

In a particular implementation, the secure data is an identifier, the at least one item of sensitive text data being determined in the determination step f) from a file that is accessible to the second processor unit, the file comprising at least one identifier in association with the at least one item of sensitive text data.

In a particular implementation, the secure data comprises the at least one item of sensitive text data in encrypted form, the determination in step f) comprising decrypting the secure data in order to deduce said at least one item of sensitive text data therefrom.

In a particular implementation, the secure document has a plurality of markers, with the user selecting one marker in step c) automatically causing all of the markers contained in the secure document to be selected, such that the third processor unit acts in step h) to trigger the display of each item of sensitive text data obtained on the basis of said markers.

In this way, in determination step d), the secure data associated with all of the markers MQ present in the secure document is determined, thereby subsequently enabling the user to view all of the items of sensitive text data present in the original electronic document as a result of selecting a single marker. This makes it easier to access the plurality of items of sensitive text data.

In a first particular implementation, the second and third processor units form a single processor unit situated in the first terminal, the second processor unit being contained in the first terminal. The first and second processor units are respectively first and second operating systems that execute exclusively of each other.

In an implementation, these operating systems may operate at the same time.

In a particular implementation, when one of the operating systems is in an active mode, the other is in an inactive mode. A switch-over mechanism may be provided for switching over from one operating system to the other.

In a particular implementation, the second operating system satisfies the "TEE Protection Profile" version 1.0 standard defined by the GlobalPlatform Organization.

For example, the second processor unit operates as a trusted execution environment operating system (TEE OS) while the first processor unit operates as a rich operating system (OS).

Alternatively, the second and third processor units may be situated outside the first terminal.

In a particular implementation, the third processor unit is suitable for controlling a camera device, and the marker is a machine-readable code, and the marker is selected in step c) by the third processor unit under user control when the marker displayed on the first terminal is viewed by said camera device.

This implementation is advantageous in that it enables the user to select one or more markers present in the secure document in a manner that is simple and ergonomic. For example, the user can use the second terminal like a magnifying glass in front of the screen of the first terminal in order to select chosen markers.

By way of example, the third processor unit may act for a determined duration continuously to select each of the markers viewed by means of said camera device. This makes it much easier to select a plurality of markers.

In a second particular implementation, the second and third processor units form a single processor unit situated in a second terminal remote from said first terminal.

This second implementation enables the second terminal to obtain the secure data directly from the first terminal without any need to involve a remote server, if any.

In a variant of this second implementation, during the obtaining step e) the secure data is received by the third processor unit from the first terminal via a short- or medium-range communications link established between the first and second terminals.

In a variant of this second implementation, the method comprises the third processor unit receiving processing means (e.g. a program, a cryptographic key, or indeed a correspondence table), with the determination step f) being performed by the third processor unit on the basis of the processing means in combination with said secure data.

In a third particular implementation, the second processor unit is distinct from the third processor unit, the third processor unit being contained in a second terminal distinct from said first terminal and the second processor unit being contained in a server remote from said first and second terminals, the method comprising the second processor unit transmitting determined data to the third processor unit to enable the third processor unit to obtain the at least one item of sensitive text data in step g).

In preferred manner, the communications link used in this third particular implementation between the second and third processor units does not pass via the first processor unit. Having this link independent of the first processor unit makes it possible to ensure that all of the data sent from the server to the second terminal is sent in secure manner (e.g. sending an item of sensitive text data).

In a variant of this third implementation, the determined data is transmitted by the second processor unit to the third processor unit in encrypted form using a first cryptographic key, the at least one item of sensitive text data being obtained by the third processor unit in step g) by decrypting the determined data that is encrypted from a second cryptographic key matching the first cryptographic key. This variant makes it possible to obtain a good level of security.

In a variant of this third implementation, the method includes the first processor unit authenticating the user with the remote server, where authentication comprises sending authentication data of said user to the second processor unit, with the first cryptographic key being determined by the second processor unit on the basis of said authentication data.

In a variant of this third implementation, the method comprises:

the first processor unit of the second terminal searching in a near vicinity of the first terminal with the help of wireless communication means;

the first processor unit receiving an identifier of the second terminal when it is in the detection field of the wireless communication means; and the first processor unit transmitting said identifier to the remote server;

wherein the second processor unit identifies the second terminal to which the determined data is to be transmitted on the basis of said identifier.

This variant makes it possible to ensure that the determined data is indeed sent to the appropriate third processor unit. The user can thus view the items of sensitive text data on a chosen second terminal. In particular, the user may select from a plurality of terminals that terminal which presents a trust level that is sufficient to enable the processing method to be performed from the point of view of the third processor unit.

In a variant of this third implementation, the third processor unit is suitable for controlling a camera device, and the marker is a machine readable code, wherein:

the marker is selected in step c) by said third processor unit under user control when the marker displayed on the first terminal is viewed by means of said camera device;

said secure data is determined in step d) by the third processor unit; and in step e), the second processor unit receives the secure data from the third processor unit.

In a variant of this third implementation, the third processor unit acts for a determined duration continuously to select each marker viewed by means of the camera device.

More generally, the third processor unit is contained in a mobile telephone. In particular, the first and/or the second terminal may be a mobile telephone, where appropriate.

In a particular implementation, the selection step c) is performed by means of a pointer that can be seen in the display of step b) on the first terminal, and that can be controlled by the user by means of an interface of the first terminal, the pointer being configured to change its visual appearance during said display when it enters a region of the secure electronic document that corresponds to said marker.

It is thus easier for the user to identify the markers in the secure document, in particular when the secure document has a large number of items of sensitive text data or when the markers are not easy for the user to view.

In a particular implementation, the method comprises the third processor unit receiving the secure electronic document and the third processor unit displaying the secure electronic document in step h) in combination with the at least one item of sensitive text data.

In a particular implementation, the method includes the following steps before step a), which steps are performed by a fourth processor unit:

i) obtaining an initial electronic document;

j) determining in said initial electronic document the at least one item of sensitive text data that is to be made secure;

k) generating the secure data from the at least one item of sensitive text data; and l) processing the initial electronic document in order to obtain the secure electronic document by including in the initial electronic document the marker associated with the secure data, and by deleting or masking the at least one item of sensitive text data.

As mentioned above, creating the secure electronic document advantageously serves to limit access to items of sensitive text data so as to mitigate certain security risks associated in particular with the above-mentioned first terminal.

In a particular implementation, the processing step l) further comprises including the secure data in the initial electronic document.

In a particular implementation, the obtaining step i) comprises receiving the electronic document from a remote server.

In a particular implementation, the determination step j) comprises displaying said initial electronic document and the fourth processor unit under the control of a user selecting the at least one item of sensitive text data that is to be made secure.

In a particular implementation, the initial electronic document comprises a sequence of successive items of text data in a determined order, the marker being inserted by the fourth processor unit into the initial document during said processing step l) such that when the secure electronic document is displayed in step b), the marker replaces said at least one item of sensitive text data in said sequence of successive items of text data.

Thus, the marker inserted by the fourth processor unit is in the same position in the sequence of successive items of text data as the corresponding item of sensitive text data before it was deleted or masked.

In a particular implementation, during the processing of step l), at least 70% of the text data initially contained in the initial electronic document is deleted or masked in the secure electronic document.

In this way, although the sensitive information is no longer directly accessible to the user when the secure document is displayed, the user is nevertheless in a position to take cognizance of the general tenor of the document. In particular, the user can assess whether the content is of interest and can determine whether it is necessary to access the protected text data.

In a particular implementation, the various steps of the processing method are determined by computer program instructions.

Consequently, the invention also provides a computer program on a data medium, the program being suitable for being performed in a terminal or a computer, the program including instructions adapted to performing at least a portion of the steps of the above-defined processing method.

The invention also provides one or more computer-readable data media (or recording media), including at least some of the instructions of a computer program as mentioned above.

The above-mentioned programs may use any programming language, and be in the form of source code, object code, or code intermediate between source code and object code, such as in a partially compiled form, or in any other desirable form.

Furthermore, the above-mentioned data media may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data media may correspond to a transmissible medium such as an electrical or optical signal, which may be conveyed via an electrical or optical cable, by radio, or by other means. The program of the invention may in particular be downloaded from an Internet type network.

Alternatively, the data media may correspond to an integrated circuit in which the program is incorporated, the circuit being adapted to execute or to be used in the execution of the method in question.

The present invention also provides a system as defined above for performing the processing method of the invention, the system comprising the first processor unit contained in the first terminal, the second processor unit and the third processor unit, so as to enable a user to access sensitive text data from the secure electronic document.

In particular, the system may comprise:

a) obtaining means enabling the first processor unit to obtain the secure electronic document;

b) trigger means enabling the first processor unit to trigger the display of the secure electronic document on the first terminal;

c) selection means enabling the user to select at least one marker contained in the secure document and viewable by the user during the display;

d) determination means for determining secure data from the selected marker, with at least one item of sensitive text data being recoverable from the secure data;

e) obtaining means enabling the second processor unit to obtain the secure data;

f) determination means enabling the second processor unit to determine said at least one item of sensitive text data for viewing on the basis of the secure data;

g) obtaining means enabling the third processor unit to obtain said at least one item of sensitive text data; and h) trigger means enabling the third processor unit to trigger the display of said at least one item of sensitive text data;

wherein said second and third processor units are distinct from said first processor unit and each of them executes an operating system that is independent relative to the operating system of the first processor unit.

The various implementations and variants defined above for the processing method of the invention apply in like manner to the system of the invention. In addition, the same advantages as those mentioned above result from the system of the invention and from its variants.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF IMPLEMENTATIONS

The present invention relates to making electronic documents secure and more particularly it relates to providing secure access to sensitive text data by means of a trusted processor unit.

The invention applies more particularly to making secure access to sensitive text data contained in an electronic document, which document is received by a terminal presenting a level of trust that is not sufficient to allow safe access to said sensitive data.

In this document, the term "text data" is used to designate any data in electronic format (Word, PDF, etc. format) that relates to text, to digits, and more generally to characters or symbols in any language understandable to a human or to a machine. The data may be of Unicode type, for example. In addition to text data, the present invention may apply more generally to graphics data contained in an electronic document. Graphics data in the meaning of the invention may be text data, a vector illustration (e.g. a graphic), and/or an image.

In order specifically to satisfy the above-identified needs, the Applicant has developed a solution enabling an electronic document containing at least some sensitive text data for protection to be made secure, and also enabling access to such a document to be made secure so as to avoid compromising the confidentiality or the security of the sensitive data when a user accesses said document. The invention thus seeks in particular to create a document that is secure and subsequently to view that document in a manner that is secure.

More precisely, the invention provides a processing method that is performed by a system comprising at least two distinct processor units, each of these two processor units executing an operating system that is independent of the other operating system. As explained in greater detail below, the first processor unit is intended in particular to display a secure document that has been subjected to processing for making at least one item of sensitive text data (or at least one sensitive data string) secure. The second processor unit seeks to provide a user with secure access to the sensitive data in question. Accessing the sensitive data by means of the independent second processor unit makes it possible to avoid potential security risks associated with the first processor unit.

Figure 1:
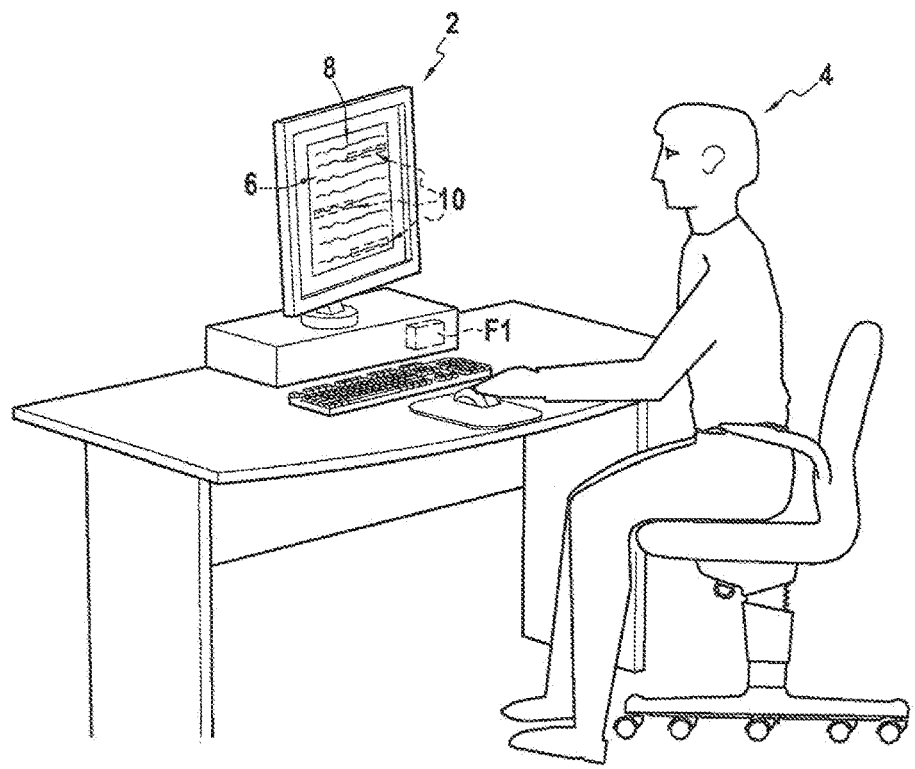
FIG. 1, described above, shows a situation given by way of example in which a user is viewing a document containing sensitive text data on the screen of a terminal.
Figure 2:
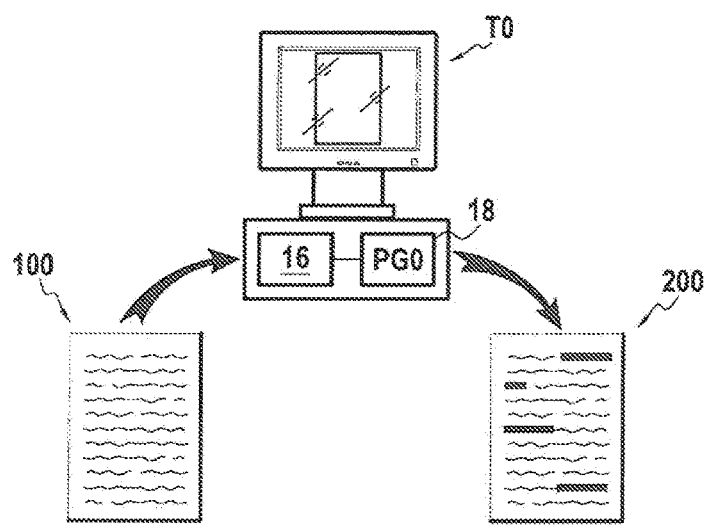
FIG. 2 is a diagram showing the creation of a secure document in accordance with a particular implementation of the invention.
Figure 3A:
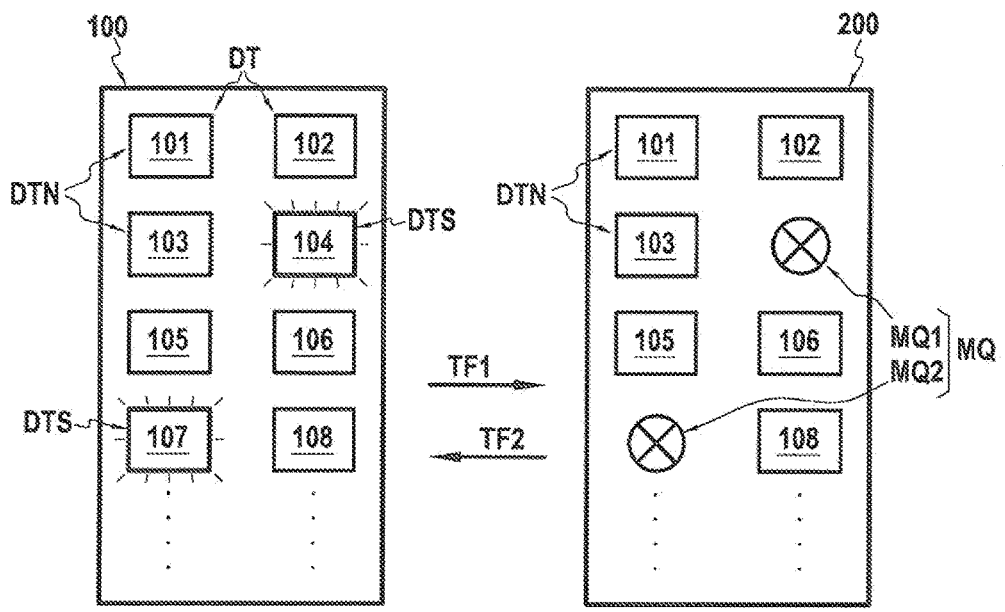
FIG. 3A shows more particularly the structure of an initial electronic document and of a secure document obtained from the initial electronic document in accordance with a particular implementation of the invention.
Figure 3B:
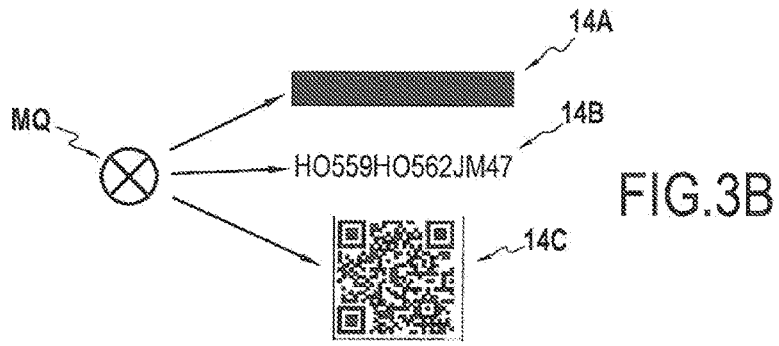
FIG. 3B is a diagram showing implementations of a marker in the meaning of the invention.
Figure 4:
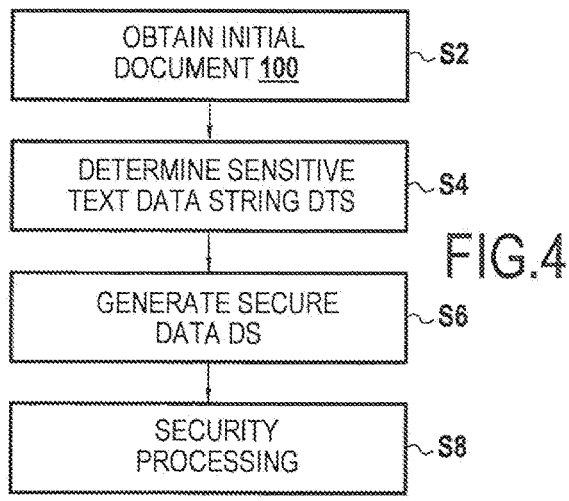
FIG. 4 is a flow chart showing the main steps of creating a secure document in a particular implementation of the invention.

With reference to FIGS. 2 to 4 there follows a description of an example in a particular implementation of the invention of creating a secure electronic document 200 on the basis of an initial electronic document 100 containing at least one item of sensitive text data. Various ways of obtaining secure access to such sensitive text data are subsequently described with reference to FIGS. 5 to 16.

FIG. 2 is a diagram showing a terminal T0 used in a particular implementation for creating a secure electronic document 200 from an initial electronic document 100, which initial document includes at least one item of sensitive text data for which it is necessary to protect access.

In this example, the terminal T0 presents the conventional hardware architecture of a computer or the equivalent and it comprises in particular a processor unit 16 (e.g. a processor) capable of executing a computer program PG0 contained in a memory 18 of T0. Executing the program PG0 makes it possible to apply security processing TF1 to the original document 100 in order to obtain the secure document 200. In this example the document 100 includes a plurality of items of text data, some of which present a sensitive nature in the meaning of the invention.

FIG. 3A shows more precisely the structure of the original electronic document 100 and also the structure of the secure electronic document 200 once the security processing TF1 has been performed. In the presently-described example, the electronic document 100 comprises a plurality of items (or blocks) of text data DT, this data containing:

text data DTN referenced 101 to 103 and 105 to 108 that is said to be "normal" in that it is not considered as being sensitive and therefore does not require any particular processing in terms of security; and text data DTS referenced 104 and 107 that is said to be "sensitive" and that therefore requires making secure in accordance with the method of the invention.

The transformation TF1 serves to convert the electronic document 100 into the secure document 200, which secure document comprises:

normal text data DTN referenced 101 to 103 and 105 to 108 that is identical to the data in the original document 100; and markers MQ1 and MQ2 (collectively referred to as MQ) that are associated with the respective items of sensitive text data 104 and 107.

The respective markers MQ1 and MQ2 constitute markers marking respective items of sensitive text data 104 and 107 that have been masked or deleted from the secure document 200. In this example, the markers replace the respective sensitive items of text data 104 and 107.

As explained in detail below, the markers MQ can be viewed by the user when the secure document 200 is being displayed (on T0 in this example). Each marker is associated with at least one corresponding item of sensitive text data DTS in the original document 100.

When the document 200 is displayed on the screen, the user cannot see or access directly the sensitive text data DTS. However the user can make use of an appropriate man/machine interface to select one or more markers MQ that are present in the secure document 200. As explained below, a user selecting a marker MQ initiates processing seeking to provide access to the item(s) of sensitive text data associated with each selected marker.

The processing method in this particular implementation serves to perform the inverse conversion TF2 in order to obtain the electronic document 100 from the secure document 200, or at least this method gives access to the sensitive data DTS from the secure document 200.

Each marker MQ may be of any form, providing it is:

viewable by the user in the secure document 200 when it is displayed; and selectable in order to enable the method of the invention to obtain the associated item(s) of sensitive text data.

As explained in greater detail below, each marker MQ is associated with at least one item of secure data DS that, in accordance with the method of the invention, subsequently enables the user to access one or more corresponding items of sensitive text data. A marker may be associated exclusively with a single item of secure data DS. Furthermore, a plurality of markers MQ may be associated with the same secure data DS.

Below in this document it should be understood that an item of secure data may correspond to one or more items of sensitive text data, as appropriate.

FIG. 3B shows some examples of markers MQ in accordance with the present invention. The marker MQ may be represented by any graphics object, such as for example a simple black (or white) mark appearing in the secure document 200, preferably at the location where the corresponding item of sensitive text data DTS would otherwise have appeared.

By way of example, each marker MQ includes a link pointing to the corresponding secure data DS such that selecting the marker leads to the secure data DS being determined.

Alternatively, the marker MQ may be in the form of a code or of an identifier, e.g. the code 14B shown in the figure. As explained below, this code or identifier subsequently makes it possible to recover the corresponding item of sensitive text data.

In another variant, the marker MQ may be formed by a code 14C of the 2D or equivalent type (bar code, etc.). On reading the present document, the person skilled in the art will know how to adapt the shape and the characteristics of each marker MQ to the needs of any given situation.

FIG. 4 is a flow chart showing the main steps (S2 to S8) of a method of creating a secure electronic document 200 in a particular implementation of the invention. More precisely, the processor unit 16 performs the creation method of the invention by executing the program PG0.

During a step S2, the processor unit 16 (or more generally the terminal T0) obtains the initial electronic document 100, which may for example be stored in advance in a memory of the terminal T0 or which may be received by the processor unit 16 from outside the terminal T0.

In a particular implementation, the obtaining step S2 comprises receiving the electronic document 100 from a remote server (e.g. the server SV described below with reference to FIG. 5).

In a step S4 the processor unit 16 determines one or more items of sensitive text data DTS in the initial document 100. This determination may be performed in various ways, such as for example a user selecting the item of sensitive data DTS in question while the initial document 100 is displayed on the screen of the terminal T0. In a particular implementation, the determination step S4 thus comprises displaying the original document 100 and a user selecting sensitive text data DTS to be made secure.

The sensitive data DTS is typically selected because of its confidential nature or because it is particularly sensitive in terms of security. This selection may be performed manually by the user or automatically by the processor unit 16 in application of predefined criteria.

Once the sensitive text data DTS has been determined in step S4, the processor unit 16 acts in a step S6 to generate secure data DS based on the sensitive data DTS determined in step S4, which secure data DS is used in a following step S8 for performing security processing on the electronic document 100. The secure data DS may present various forms as explained below.

During the step S8, the processor unit 16 performs security processing (editing) seeking to make the initial document 100 secure in order to obtain the secure document 200 (transformation F1). This processing comprises including in the initial electronic document 100 the marker(s) MQ associated with the secure data DS and deleting or masking the corresponding sensitive text data DTS. In a particular implementation, the security processing S8 is editing processing.

The term "masking" is used herein to mean that a user can no longer view the sensitive text data on displaying the secure document 200. In order to access the sensitive data DTS, it is necessary to perform the processing method of the invention, several implementations of which are described below.

The marker MQ presents the characteristics described above with reference to FIGS. 3A and 3B. In particular, the marker is:

viewable by the user while the secure document 200 is being displayed; and selectable by the user using appropriate selection means in order to enable the corresponding sensitive data DTS to be recovered by particular processing TF2.

In this example, the markers MQ1 and MQ2 are each associated with a respective item of secure data DS.

As mentioned above, the secure data DS may present various forms. In a first variant, the secure data DS is a code or an identifier making it possible subsequently to recover the determined item of sensitive text data DTS. In a second variant, the secure data DS comprises the item of sensitive text data DTS in encrypted form. In a third variant, the secure data DS is nothing more than the marker MQ itself. This may apply for example when the marker MQ is a code or an identifier. In this third variant, the step S6 of generating the secure data DS thus leads to generating the marker MS itself, which needs to be inserted in the step S8.

In a particular implementation, the security processing S8 further comprises including the secure data DS in the initial document 100 (as it becomes the secure document 200). Once included, the secure data DS is not necessarily visible on displaying the secure document 200. Including the secure data DS in the initial document is not essential, unlike including the marker MQ which must be present and viewable in the secure document 200 in order to enable it to be selected subsequently by the user.

In a particular implementation, the electronic document 100 comprises a sequence of successive items of text data DT in a determined order. The marker MQ is inserted (SB) by the processor unit 16 into the document 100 in such a manner that during subsequent display of the secure document 200 the marker MQ replaces the item of sensitive text data DTS among the sequence of items of text data. Thus, the marker MQ has the same position in the sequence of successive items of text data DT as the corresponding item of sensitive text data DTS prior to being deleted or masked.

In a particular implementation, during the security processing step S8, at least 70% (or even 90% or more) of the text data DT initially contained in the original electronic document 100 is deleted or masked. In this way, although the sensitive information is no longer directly accessible to the user on displaying the secure document 200, the user is still in a position to take cognizance of the general tenor of the document. In particular, the user can assess whether the content is of interest and can determine whether it is necessary to access the protected data DTS.

As mentioned above, creating the secure electronic document 200 advantageously makes it possible to limit access to sensitive text data so as to mitigate certain security risks associated in particular with a given terminal. Once the secure document 200 has been obtained, it is therefore necessary for the user to be capable of initiating processing for the purpose of recovering the item(s) of sensitive text data initially present in the original electronic document 100.

For this purpose, a processing method performed by a system SY in accordance with a first implementation is described below with reference to FIGS. 5 to 9.

Figure 5:
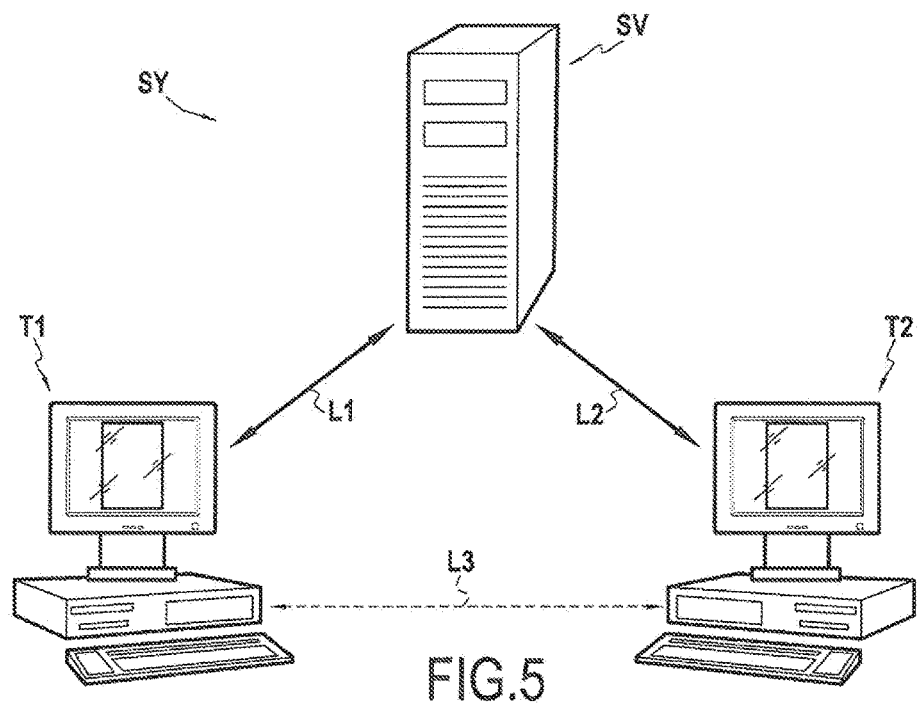
FIG. 5 is a diagram showing a system comprising a first terminal, a remote server, and a second terminal for performing a processing method in a first implementation of the invention.

FIG. 5 shows a system SY comprising a first processor unit 20 included in a first terminal T1, a second processor unit 60 and a third processor unit 40.

Each of the processor units 20, 40, and 60 may form all or part of a processor, of a controller, or of the equivalent, being capable of performing the steps required by the processing method of the invention.

In this implementation, the processor units 60 and 40 are contained respectively in a server SV and in a second terminal T2. Nevertheless, other configurations can be envisaged as explained below.

The processor units 20, 40, and 60 are thus distinct and independent from one another. In particular, the third processor unit 40 is configured to execute an operating system that is independent from the operating system executed by the first processor unit 20.

It is assumed below that the first processor unit 20 presents risks in terms of security, or at least does not provide a level of trust that is satisfactory for giving access to text data of a sensitive nature. In contrast, it is assumed that the third processor unit 40 is a trusted processor unit.

In this example, the first terminal T1 is capable of communicating with the remote server SV via a first communications link L1. Likewise, the server SV is capable of communicating with the second terminal T2 via a second communications link L2. The communications link L2 is such that it does not pass via the first terminal T1. In other words, none of the data sent by the server SV to the second terminal T2 via the link L2 passes via the first terminal T1. As can be seen below, independence between the link L2 and the first terminal T1 makes it possible to send data securely from the server SV to the terminal T2 (where such data may comprise the items of sensitive text data DTS, for example).

Optionally, the first terminal T1 and the second terminal T2 are capable of communicating with each other via a communications link L3, where appropriate.

The communications links L1, L2, and L3 may be of any type. In particular they may be wired or wireless links. By way of example, the link L3 may be a short- or medium-range wireless communications link (WiFi, Bluetooth, or near field communication (NFC), for example).

Figure 6:
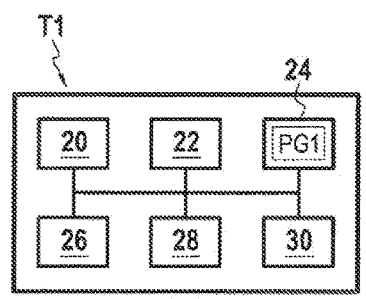
FIGS. 6, 7, and 8 show the hardware architectures respectively of the first terminal, of the remote server, and of the second terminal of FIG. 5, in a first implementation of the invention.
Figure 7:
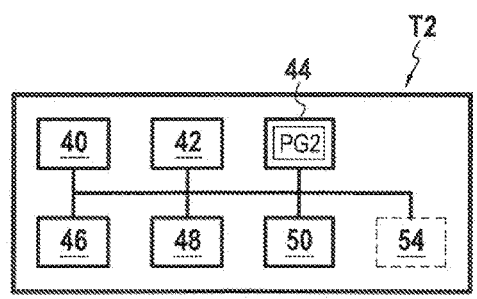
Figure 8:
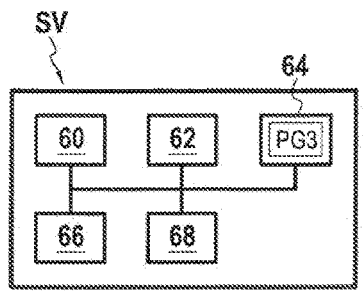

FIGS. 6, 7, and 8 are diagrams showing the hardware architectures of the first terminal T1, of the second terminal T2, and of the server SV. In this example, each of these three entities presents the hardware configuration of a conventional computer or the equivalent.

More precisely, the terminal T1 in this example comprises a first processor unit 20 (e.g. a processor or a controller), a ROM 22, a non-volatile rewritable memory 24 (e.g. of the electrically erasable programmable read only memory (EEPROM) type), a volatile rewritable memory (known as random access memory (RAM)) 26, a communications interface 28 enabling the processor unit 20 to communicate externally from the terminal T1, and a man/machine interface 30 enabling a user to interact with the terminal T1. This man/machine interface 30 comprises in particular display means such as a screen, for example.

In this example, the ROM 24 constitutes a data medium in accordance with the invention that is readable by the processor unit 20 and that stores a computer program PG1 in accordance with the invention, comprising instructions for executing at least some of the steps of a processing method of the invention.

In this example, the terminal T2 presents a hardware structure analogous to that of the terminal T1 and in particular comprises a third processor unit 40 (e.g. a processor or a controller), a ROM 42, a non-volatile rewritable memory 44 (e.g. an EEPROM), a RAM 46, a communications interface 48 enabling the processor unit 40 to communicate externally from the terminal T2, and a man/machine interface 50 enabling a user to interact with the terminal T2. In particular, this man/machine interface 50 includes display means such as a screen, for example.

By way of example, the terminal T2 is a mobile telephone, a laptop computer, a desktop computer, a tablet, or the equivalent.

If it is a mobile telephone, the third processor unit 40 may for example comprise an integrated circuit (IC) card in compliance with the ISO 7816 standard, or an IC suitable for being secured to the printed circuit of the mobile telephone. The mobile telephone then includes another processor suitable for controlling the conventional functions of a mobile telephone (controlling the display, communicating with a remote server, taking pictures, etc.). A trusted operating system is then executed on that other processor.

Optionally, the terminal T2 may also include a camera 54 suitable for acquiring moving or still pictures.

In this example, the non-volatile rewritable memory 44 constitutes a data medium in accordance with the invention that is readable by the processor unit 40 and that stores a computer program PG2 in accordance with the invention comprising instructions for executing at least some of the steps of a processing method of the invention.

The server SV likewise presents a hardware structure analogous to that of a computer and in particular it comprises in this example the second processor unit 60 (e.g. a processor or a controller), a ROM 62, a non-volatile rewritable memory 64 (e.g. an EEPROM), a RAM 66, and a communications interface 68 enabling the processor unit 60 to communicate externally from the server SV.

In this example, the non-volatile rewritable memory 64 constitutes a data medium in accordance with the invention that is readable by the processor unit 60 and that stores a computer program PG3 in accordance with the invention, comprising instructions for executing at least some of the steps of a processing method of the invention.

The main steps of the processing method performed by the processor units 20, 40, and 60 are described below with reference to FIG. 9 in accordance with a first implementation of the invention.

During a step A2, the first processor unit 20 (and more generally the terminal T1) obtains the secure electronic document 200 as described above with reference to FIGS. 2 to 4. In one particular situation, the processor unit 20 receives the secure document 200 from outside the terminal T1. In a variant, the secure document 200 has previously been stored in a memory of the terminal T1. In a particular variant, the secure document 200 has previously been created by the processor unit 20 itself so that the processor units 16 and 20 comprise the same single processor unit.

The processor unit 20 then acts in a step A4 to display the secure document 200 on the screen of the terminal T1. This display may be triggered automatically or on command by the user.

While the secure document 200 is being displayed (A4), the first processor unit 20 acts in a step A6 on command from the user to select at least one marker MQ contained in the secure document 200 and viewable on the display A4. In this first example, selection is performed by means of the man/machine interface 30, and more particularly in this example by means of a pointer PTR displayed on the screen (cf. a particular implementation described below with reference to FIG. 15).

As explained below, it is possible to envisage other ways of selecting a marker MQ within the ambit of the invention.

In this example it is assumed that only the marker MQ1 associated with the item of sensitive text data 104 has been selected by the user in step A6.

On the basis of the selected marker MQ1, the first processor unit 20 acts in a step A8 to determine the associated secure data DS from which it is possible to retrieve the item of sensitive text data 104. As mentioned above, the markers MQ (and in particular MQ1) and the secure data DS may be in various forms, and the way the determination step A8 is performed is a function of the form used for the marker MQ and for the secure data DS associated therewith.

Thus, in a first variant, the marker MQ1 is represented by any graphics object such as a simple black (or white) mark appearing in the secure document 200, preferably at the location that would otherwise have shown the corresponding item of sensitive text data DTS. The marker MQ1 may comprise a link pointing to the secure data DS such that selecting MQ1 leads to determining the associated secure data DS.

Alternatively, the marker MQ1 may be in the form of a code or of an identifier. In another variant, the marker MQ1 may be formed by a 2D code 14C, or the equivalent (a bar code, etc.).

Whatever the nature of the marker MQ1, selecting it enables the first processor unit 20 to perform the determination step A8 of determining the associated secure data DS. The processor unit 20 can recover this secure data directly from the secure document 200 (if the secure data DS is stored in the secure document 200 in association with the marker MQ), or alternatively to recover the secure data DS from outside the document 200. In this variant, the processor unit 20 may for example access a memory of the terminal T1 in order to obtain the secure data DS or in order to receive this data from outside the terminal T1.

In a particular implementation, the secure document 200 includes a plurality of markers MQ, and selecting only one of these markers (such as MQ1 for example) in the secure document 200 automatically leads to all of the markers MQ contained in the secure document 200 being selected. In this way, in the step A8, the first processor unit 20 determines the secure data item(s) DS associated with all of the markers MQ present in the secure document 200. This variant enables the user subsequently to view all of the items of sensitive text data DTS present in the original document 100 on the basis of selecting only one marker MQ, thereby facilitating access for the user.

In a preferred implementation, the third processor unit 40 proceeds in a step C10 to authenticate the user or the terminal T2 with the server SV. During this authentication step C10, the third processor unit 40 sends authentication (and/or identification) data DA1 relating to the user or to the terminal T2 to the remote server SV. This authentication data DA1 is thus received by the second processor unit 60. This authentication C10 may be performed at any time, e.g. before the forthcoming step B16.

During a step A12, the first processor unit 20 sends the secure data DS to the remote server SV. The second processor unit 60 thus obtains, in a step B12, the secure data DS in question.

In a variant, the first processor unit 20 delivers the marker MQ to the remote server SV and it is the second processor unit 60 that determines the secure data DS on the basis of the marker MQ, in a manner analogous to step A8.

Thereafter, on the basis of the secure data DS, the second processor unit 60 determines, in a step B14, the associated item of sensitive text data DTS (or possibly intermediate data DM enabling the item of sensitive text data DTS to be recovered). For this purpose, the second processor unit 60 may for example consult a file that is accessible to the server SV in order to use the secure data DS to find the corresponding item of sensitive text data DTS. This variant may be envisaged for example when the secure data DS is a code or an identifier. The file then includes at least one code or identifier in association with the corresponding item of sensitive text data DTS.

Alternatively, in step B14, the second processor unit 60 decrypts the item of sensitive text data DTS that may be included in encrypted form in the secure data DS. If authentication A10 has previously been performed between T2 and SV, the second processor unit 60 can use a decryption key associated with the terminal T2 or with the user. The second processor unit 60 may for example recover this decryption key from the authentication data DA1 received during the authentication step C10.

Thereafter, the second processor unit triggers sending (B16) of determined data DR via the communications link L2 to the second terminal T2, this data DR enabling the third processor unit 40 to obtain the item of sensitive text data DTS. This determined data DR may comprise the item of sensitive text data DTS itself, or alternatively it may comprise intermediate data DM enabling the item of sensitive data DTS to be obtained.

The third processor unit 40 included in the terminal T2 thus obtains (C18) the item of sensitive text data DTS from the determined data DR. As mentioned above, the determined data DR may comprise the item of sensitive data DTS itself or intermediate data DM enabling the item of sensitive data DTS to be recovered.

The determined data DR may be transmitted (B16) by the second processor unit 60 to the third processor unit 40 in encrypted form using a first cryptographic key CL1. In preferred manner, the second processor unit 60 determines this first cryptographic key CL1 beforehand on the basis of the authentication data DA1, if any, received from the second terminal T2 during the optional authentication step A10. Still in this variant, the third processor unit 40 obtains (C18) the item of sensitive text data DTS by decrypting the determined data DR using a second cryptographic key CL2 that matches the first cryptographic key CL1.

In a particular variant, the intermediate data DM is a code or an identifier used by the third processor unit 40 for retrieving the item of sensitive text data DTS. For this purpose, the third processor unit may, for example, consult a file (or a list) containing such a code or identifier in association with the corresponding item of sensitive text data DTS.

Once the obtaining step C18 has been performed, the third processor unit 40 triggers (C20) the display of the item of sensitive text data DTS (i.e. 104 in this example). By way of example, this display is provided with the help of display means (e.g. a screen) included in the man/machine interface 50 of the second terminal T2. Alternatively, the third processor unit 40 may trigger this display on some other trusted terminal.

The user is thus in a position to view in secure manner on the second terminal T2 (a trusted terminal) the item(s) of sensitive text data DTS corresponding to the marker MQ as previously selected on the first terminal T1 (where the terminal T1 is not secure). Since the processor units 20 and 40 are independent of each other, in particular concerning their respective operating systems, the user accessing the items of sensitive data DTS via the second terminal T2 does not compromise the security of the items of sensitive data DTS.

In a particular situation, the third processor unit 40 is configured:
to obtain the secure electronic document 200;
to incorporate the item(s) of sensitive text data DTS obtained during step C18 in the secure document 200 (with the markers MQ preferably being replaced by the corresponding items of sensitive text data DTS); and
in step C20 to display the electronic document 200 in which the item(s) of sensitive text data DTS is/are incorporated.

In a variant of this first implementation, the second processor unit 60 identifies the third processor unit to which the determined data DR is to be sent in step B16 as follows. The second processor unit 60 retrieves from a memory of the server SV (or from outside the server SV) an identifier ID3 for the third processor unit 40 (or of the second terminal T2 in which the third processor unit 40 is located) on the basis of the authentication data DA1 received in the authentication step A10. This identifier ID3 may be a telephone number or the equivalent, e.g. an international mobile subscriber identity (IMSI), an IP address or a universal resource locator (URL), . . . .

In another variant, the first processor unit 20 searches its near environment, preferably on request made by the second processor unit 60, for the third processor unit that is to receive the determined data DR in the step C16. To do this, the first processor unit 20 may for example make use of wireless communication means (NFC, WiFi, or Bluetooth, etc.) of the communication interface 28 in order to detect the third processor unit 40 in its proximity (or in order to detect the second terminal T2 in which the third processor unit 40 is located). For this purpose, the processing method of the invention may comprise the following steps:
the first processor unit 20 searching for the second terminal T2 in the near vicinity of the first terminal T1 with the help of wireless communication means;
the first processor unit 20 receiving an identifier ID3 of the third processor unit (or of the second terminal T2) when located in the detection field of the wireless communication means; and
the first processor unit 20 sending the identifier ID3 to the remote server SV;
wherein the second processor unit 60 uses the identifier ID3 to determine that the data DR is to be sent to the second terminal T2 (or to the third processor unit 40) in step B16.

If a plurality of potential third processor units are detected in the proximity of T1, a selection is performed automatically by the first processor unit 20 on the basis of predefined criteria, or alternatively the selection is performed manually by the user. In a particular configuration, the first processor unit 20 preselects the third processor unit 40 (or the terminal T2), and the user confirms the selection by means of the man/machine interface 30 (or possibly 50).

The above variants make it possible to ensure that the determined data DR is sent to the appropriate third processor unit. The user can thus view the items of sensitive text data DTS on a chosen second terminal T2. The user may in particular select from a plurality of terminals the terminal that presents a level of trust that is sufficient for performing the processing method from the point of view of the third processor unit.

It should be observed that in this specification, unless specified to the contrary, elements that are common to two distinct implementations are given the same reference signs and present characteristics that are identical, so they are not described again for reasons of simplicity.

Figure 9:
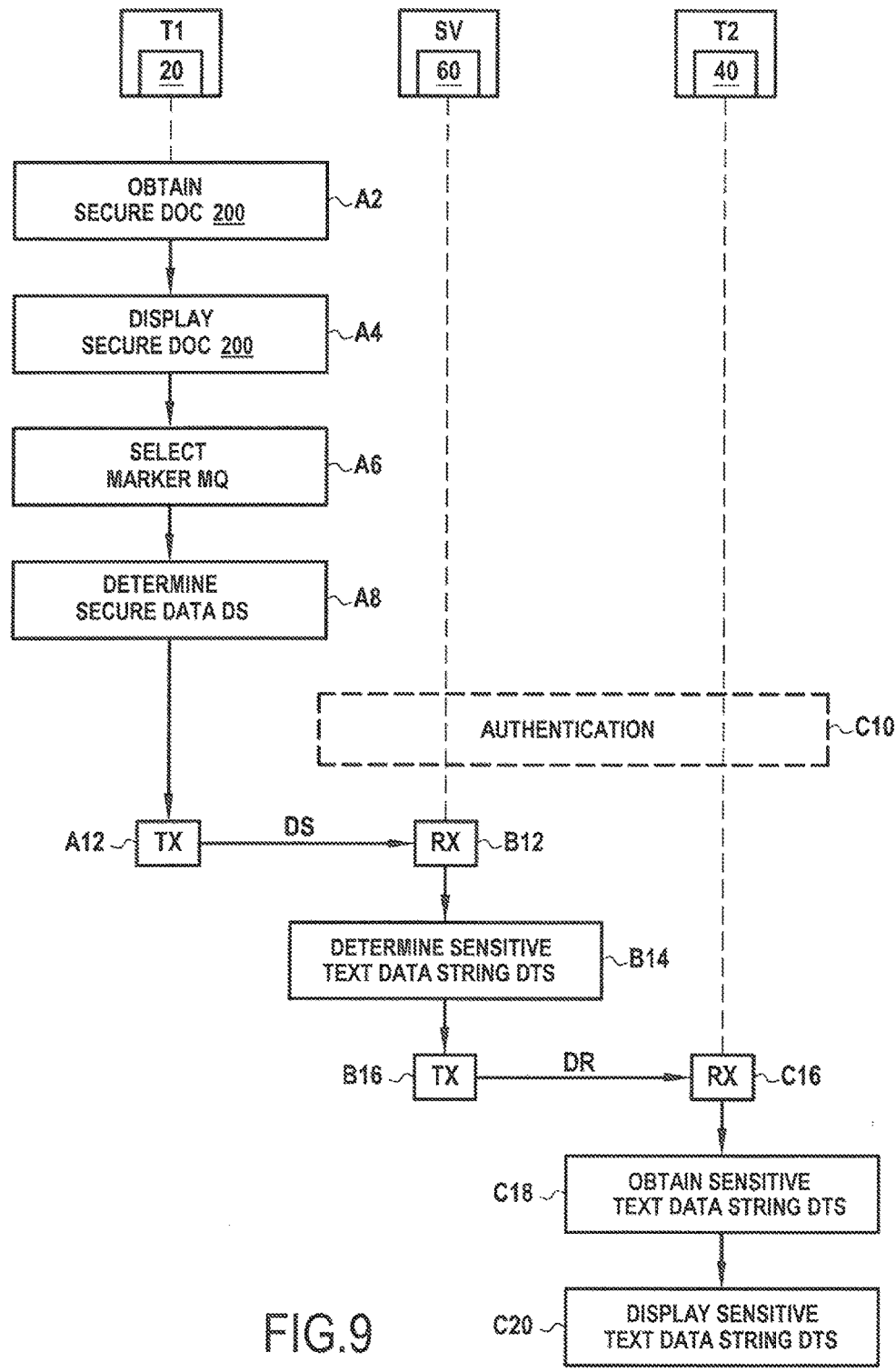
FIG. 9 is a flow chart showing the main steps of a processing method in the first implementation of the invention.
Figure 10:
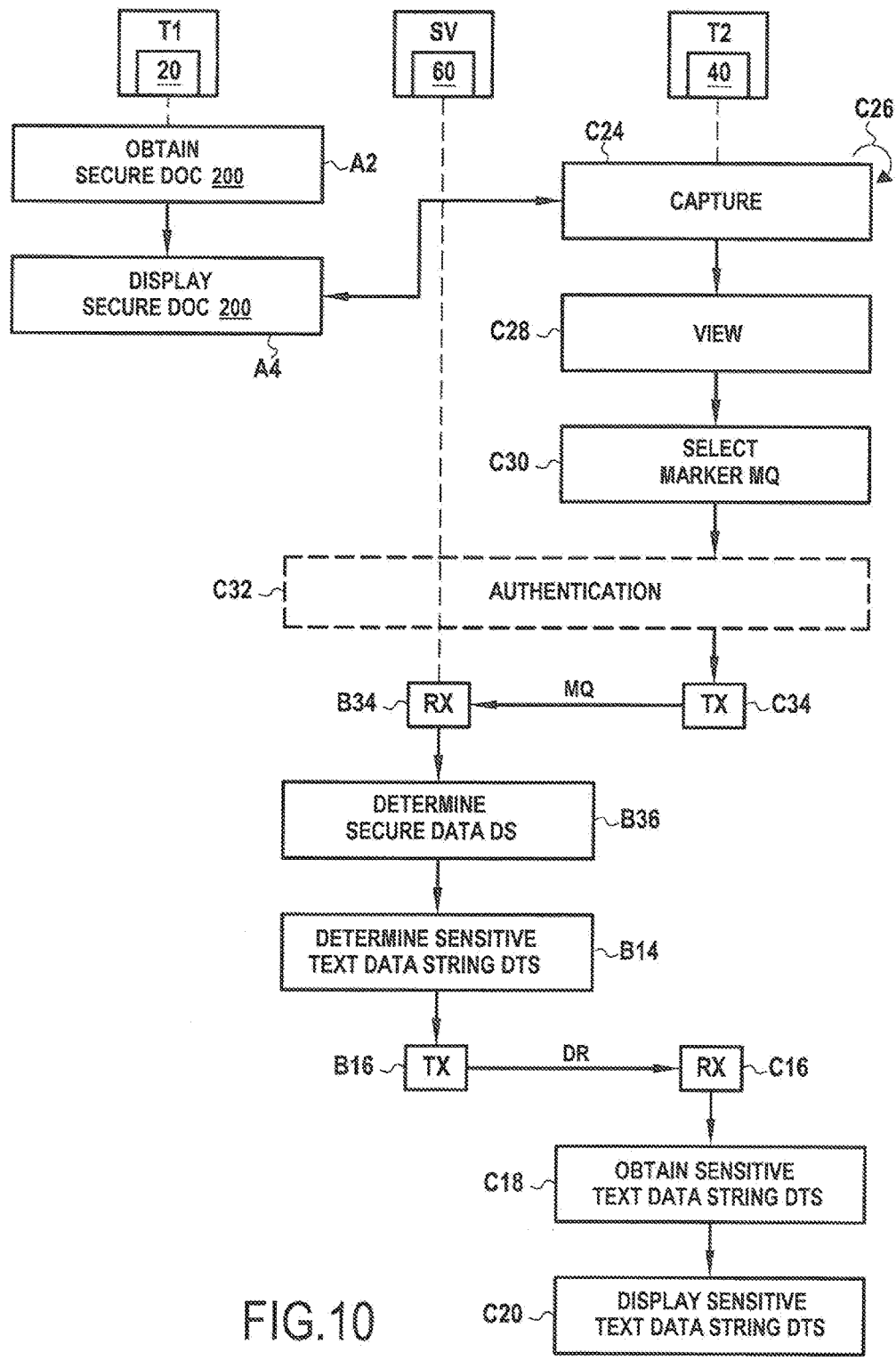
FIG. 10 is a flow chart showing a variant of the FIG. 9 implementation of the method.
Figure 11:
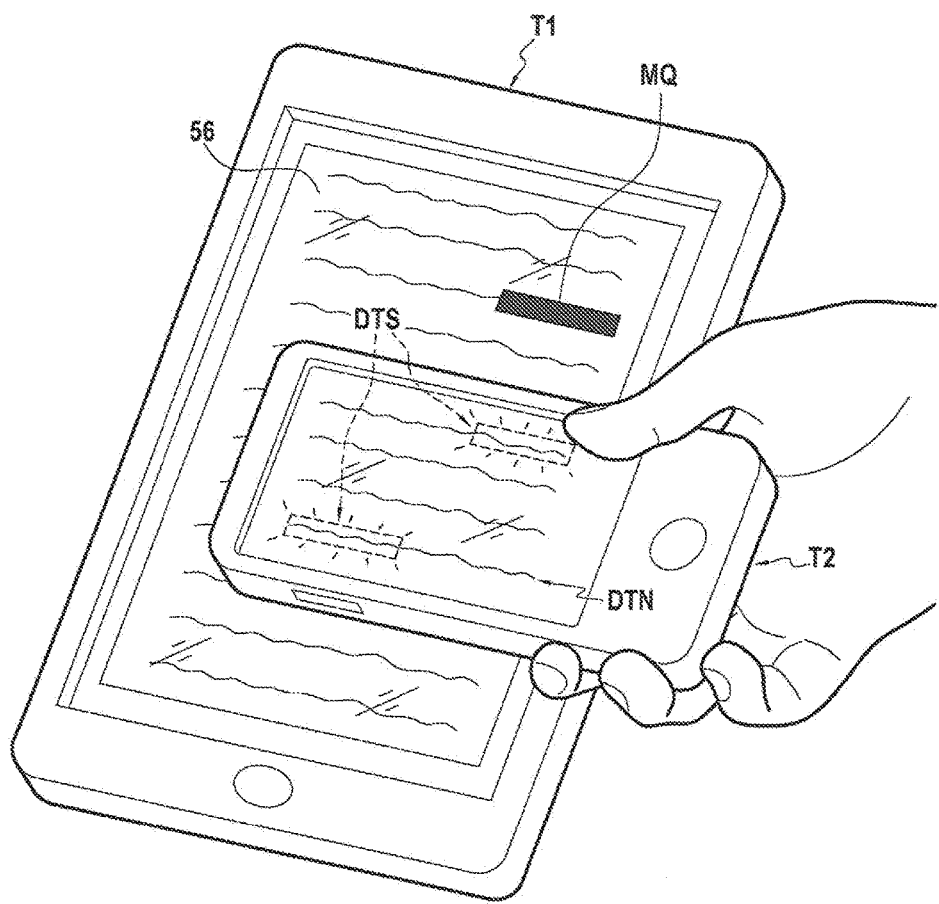
FIG. 11 shows an example of capturing markers displayed on the screen of a first terminal in accordance with the variant of FIG. 10.
Figure 12:
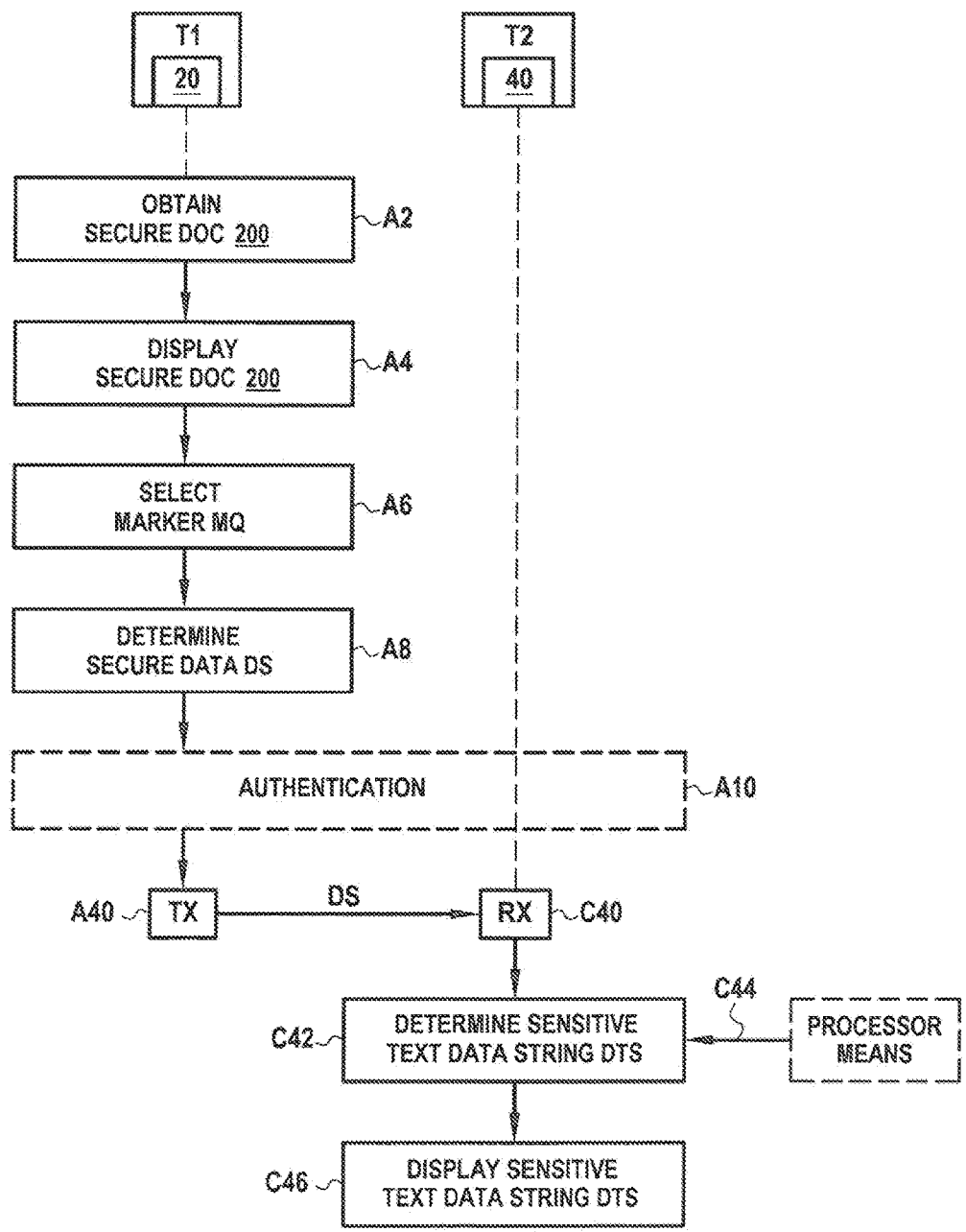
FIG. 12 is a flow chart showing the main steps of a processing method in a second implementation of the invention.

There follows a description with reference to FIGS. 10 and 11 of a variant of the first implementation shown in FIG. 9. This variant differs from the above-described first implementation mainly in that the first processor unit 20 uses the camera means 52 of T2 in order to select one or more markers MQ in the secure document 200.

More specifically, the first processor unit 20 performs the steps A2 and A4 in the same manner as explained above with reference to FIG. 9. As already mentioned, the markers MQ1 and MQ2 are visible on the screen while the secure document 200 is being displayed on the first terminal T1. The user can thus see that items of sensitive text data DTS have been marked or deleted in the secure document 200. In this variant, the user makes use of the camera device 54 of the second terminal T2 for selecting one or more chosen markers MQ. In this variant, it is necessary for the markers MQ to be machine-readable, and more particularly in this example for them to be capable of being interpreted by the third processor unit 40.

More specifically, during the step A4 of displaying on the screen 56 of the first terminal T1, the user positions or points the camera device 54 so as to view on the screen of the second terminal T2 at least one marker MQ visible on the screen 56 of T1. In the example shown in FIG. 11, the second terminal T2 is a mobile telephone and its camera device 54 comprises a camera situated in the back of the mobile telephone. By passing the mobile telephone T2 in front of the screen 56 of the first terminal T1, the user ensures that the camera captures (C26) one or more images representing the content of the secure document 200 while it is being displayed on the screen 56 of T1. In preferred manner, this image capture (C26) is performed continuously by the camera device 54 for a determined non-zero duration. The user thus views (C28) on the screen of T2 the marker(s) MQ in question (together with any neighboring normal text data DTN, in this example). The third processor unit 40 of T2 then selects (C30) one or more markers MQ (e.g. MQ1), preferably on command issued by the user with the help of the man/machine interface 50, for example. Alternatively, the selection C30 may be performed automatically by the third processor unit 40 in systematic manner or in compliance with predefined criteria.

In a particular situation, the third processor unit 40 performs a step C30 of continuously selecting each marker MQ viewed by means of the camera device 54 for some determined non-zero duration. The user preferably controls the beginning and the end of this continuous selection period.

In optional manner, the third processor unit 40 performs a step C32 of authenticating the user or the second terminal T2 with the server SV. During the authentication step C32, the third processor unit 40 may for example trigger the sending of authentication data DA2 of the user or of the terminal T2 to the server SV.

The third processor unit 40 then triggers (C34) sending of the selected marker MQ to the server SV. The second processor unit 60 thus receives (B34) the marker MQ in question. Consideration is given below to the situation in which only one marker MQ1 is sent to the server SV in step C34.

On the basis of the received marker MQ1, the second processor unit 60 then determines (B36) the secure data DS in a manner analogous to above-described step A8. The second processor unit 60 then determines (B14) an item of sensitive text data DTS on the basis of the secure data DS in the manner explained above with reference to FIG. 9. The steps B16, C16, C18, and C20 are then performed in the same manner as in the implementation of FIG. 9.

The variant of FIG. 10 is advantageous in that it enables the user to select one or more markers MQ present in the secure document 200 in a manner that is simple and ergonomic. By way of example, the user may use the terminal T2 like a magnifying glass in front of the screen of the first terminal T1 in order to select chosen markers MQ.

In preferred manner, the corresponding items of sensitive text data DTS are displayed immediately on the screen of the second terminal T2 so as to take the place of the selected marker MQ.

As mentioned above, the configuration of the FIG. 5 system SY is not the only configuration that may be envisaged in the ambit of the invention. A second implementation of the invention is described below with reference to FIG. 12.

In this second implementation, the second and third processor units 60 and 40 shown in FIG. 5 constitute a single processor unit 40 situated in the second terminal T2 that is remote from the first terminal T1. In other words, in this second implementation, the server SV is not involved in performing the invention. In this second implementation, the first processor unit 20 contained in T1 and the third processor unit 40 contained in T2 interact in order to perform the processing method of the invention.

More specifically, the first processor unit 20 performs the steps A2, A4, A6, and A8 as described above. Optionally, the first processor unit also performs an authentication step A10, this time with the terminal T2 in a manner analogous to above-described step C10.

In step A40, the first processor unit 20 triggers sending of the secure data DS to the second terminal T2. The identity of the terminal T2 to which the secure data DS is to be sent may be determined with the help of wireless communication means in a manner analogous to the corresponding variant described above with reference to the first implementation of FIG. 9.

In one particular configuration, the secure data DS is sent (A40) from the first terminal T1 via the communications link L3 (preferably a link of short or medium range) that is established between the first and second terminals T1 and T2.

After receiving (C40) the secure data DS, the third processor unit 40 determines (C42) the corresponding item of sensitive text data DTS from said secure data DS. This determination may be performed in a manner analogous to step B14 that is performed by the second processor unit 60 in FIG. 9.

In this implementation, the third processor unit 40 must thus have the processing means needed for obtaining the item of sensitive text data DTS from the secure data DS. These processing means may vary depending on the nature of the received secure data DS.

These processing means may comprise a file (or a table) accessible to the third processor unit 40, the file comprising at least the correspondence between the secure data DS obtained in step C40 and an item of sensitive text data DTS (e.g. when the secure data DS is a code or an identifier enabling such a file to be used).

These processing means may also comprise decryption means when the secure data DS comprises the item of sensitive text data DTS in encrypted form. These means may in particular comprise a decryption program or indeed a decryption key.

When such processing means are received by the third processor unit 40, it uses these means in combination with the secure data obtained in step C40 in order to determine the item of sensitive text data DTS.

In a particular implementation, the third processor unit 40 receives (C44) at least a portion of the processing means from outside the second terminal T2, e.g. from a remote server (e.g. the server SV).

The third processor unit 40 also triggers (C46) the display of the item of sensitive text data DTS in the same manner as in the step C20 described above with reference to FIG. 9.

This second implementation thus enables the second terminal T2 to obtain the secure data DS directly from the first terminal T1 without it being necessary to involve a remote server such as the server SV.

Figure 13:
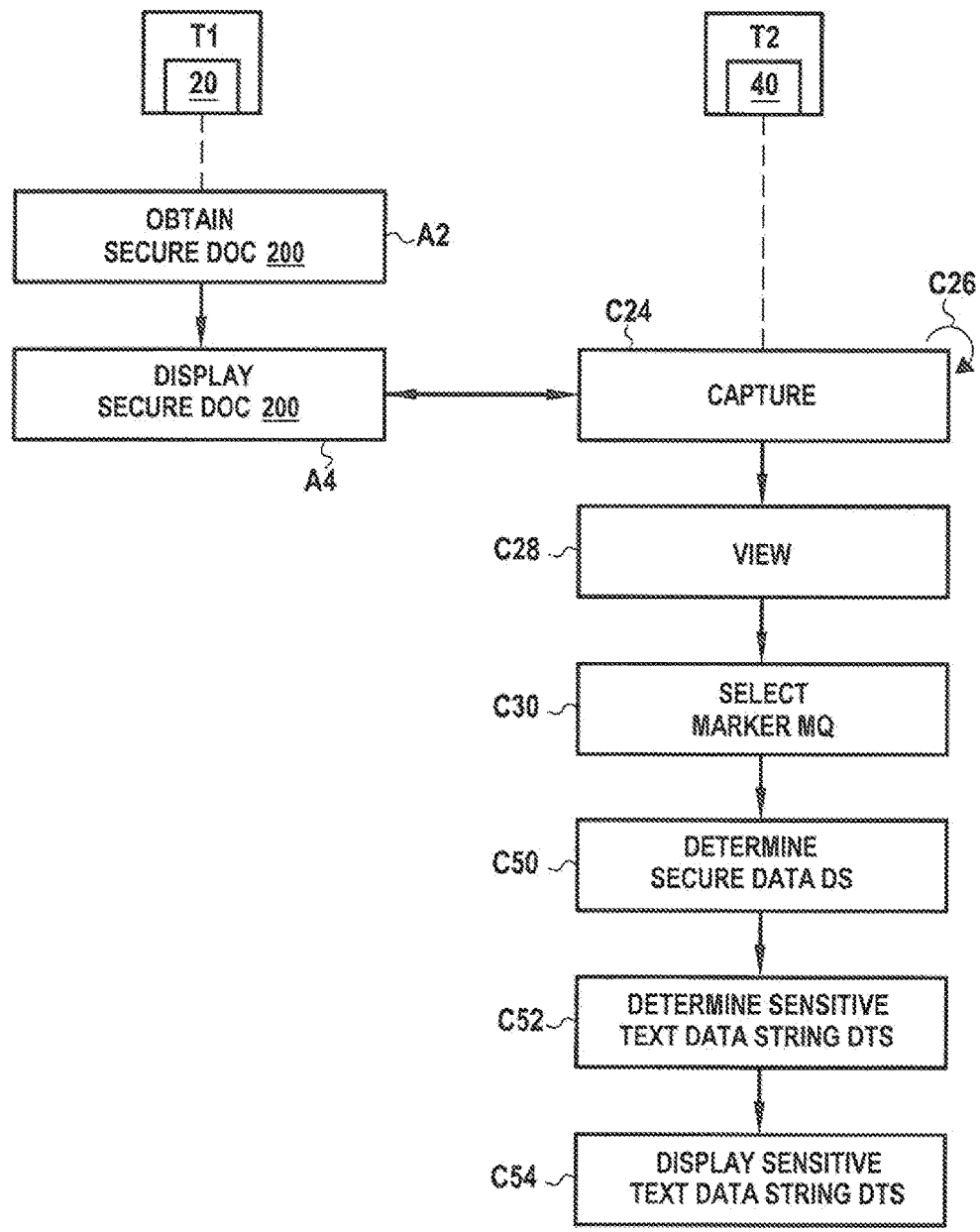
FIG. 13 is a flow chart showing a variant of the FIG. 12 implementation of the method.

With reference to FIG. 13 there follows a description of a variant of the second implementation. This variant makes use of the camera device 54 of the terminal T2 in a manner analogous to the variant described above with reference to FIGS. 10 and 11.

More specifically, the first processor unit 20 performs the steps A2 and A4 as described above. The third processor unit 40 also performs the steps C24, C26, C28, and C30 as described above with reference to FIG. 10.

Thereafter, the third processor unit 40 determines (C50) the secure data DS on the basis of the selected marker(s) MQ. By way of example, this determination may be performed in a manner analogous to above-described steps A8 or B36.

On the basis of the secure data DS, the third processor unit 40 determines (C52) the item of sensitive text data DTS in a manner analogous to above-described steps C18 or C42.

The third processor unit 40 then triggers (C54) the display of the item of sensitive text data DTS in a manner analogous to step C20 or C46.

This variant thus makes it possible to select one or more markers in ergonomic manner by means of the camera device 54 of the second terminal T2, as shown for example in FIG. 11.

Figure 14:
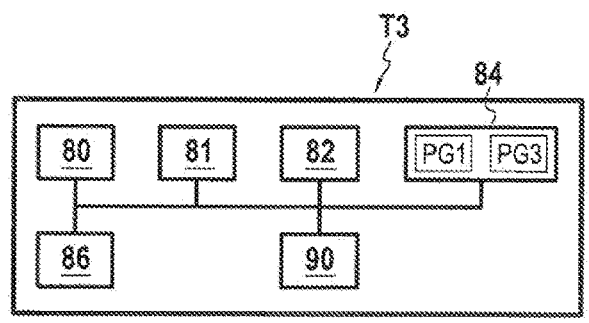
FIG. 14 shows the hardware architecture of a terminal in accordance with a third implementation of the invention.
Figure 15:
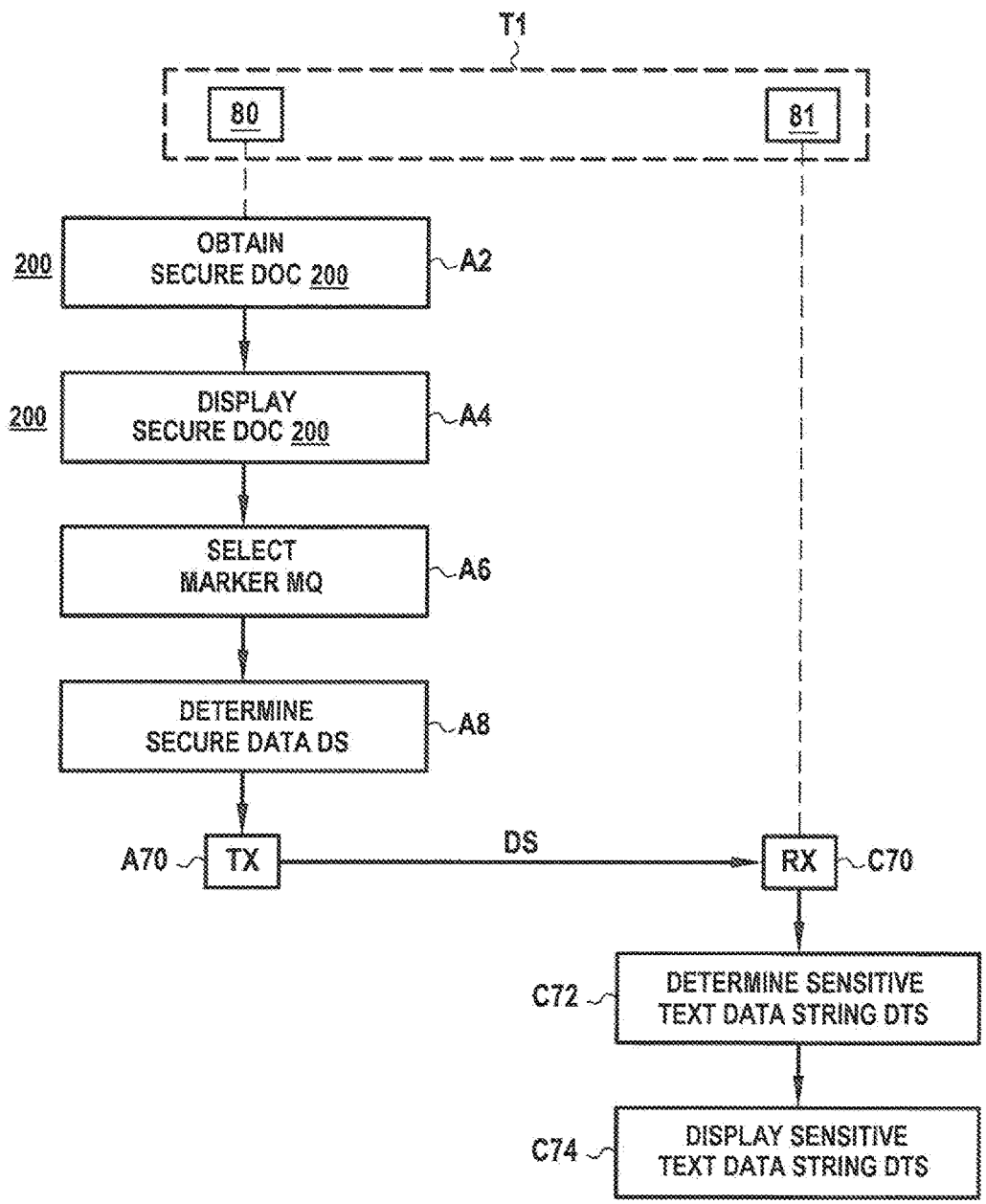
FIG. 15 is a flow chart showing the main steps of a processing method in the third implementation of the invention.

With reference to FIGS. 14 and 15, there follows a description of a third implementation of the invention. This implementation differs from the second implementation as described above in that the two processor units 80 and 81 (referred to herein respectively as the "first" and the "second" processor units) that interact in order to accomplish the method of the invention are both situated in the same terminal, namely the terminal T3 in the example described below.

It is assumed here that the first processor unit 80 presents risks in terms of security, or at least does not provide a level of trust that is satisfactory for allowing access to text data of a sensitive nature. In contrast, it is assumed that the second processor unit 81 is a trusted processor unit.

As in the above-described implementations, each of the processor units 80 and 81 executes an operating system that is independent of the other. These two processor units are thus distinct and independent of each other, which means that it is possible to ensure the necessary security level when the user accesses text data of sensitive nature by means of the second processor unit 81.

In the example shown in FIG. 14, the hardware structure of the terminal T3 is that of a computer or the equivalent, and in particular it comprises a first processor unit 80 and a second processor unit 81, a ROM 82, a non-volatile rewritable memory 84 (e.g. an EEPROM), a volatile rewritable memory (RAM) 86, and a man/machine interface 30 enabling a user to interact with the terminal T3. This man/machine interface 30 includes in particular display means such as a screen, for example.

In this example, the memory 84 constitutes a data medium in accordance with the invention that is readable by the processor units 80 and 81 and that stores computer programs PG1 and PG3 in accordance with the invention, which programs include instructions for executing the main steps of a processing method of the invention.

In a particular implementation, the two processor units 80 and 81 are (or execute) two operating systems that are mutually independent of each other.

In a first variant, these two operating systems operate in parallel, e.g. by using a multicore processor, in other words a processor having at least two physical cores that operate in parallel.

Alternatively, both operating systems operate such that when either one of them is executing, the other one is on standby. Under such circumstances, it is said that their execution is mutually exclusive. In a particular implementation, a switch-over mechanism is provided to make it possible to switch over from one operating system to the other so that they can execute in exclusive manner.

In this example, the first operating system 80 is a "rich operating system" and is designed to provide a user of the terminal T3 with a wide range of functions. The first operating system provides memory size and performance that are greater than the memory size and performance of the second operating system 81. Examples of rich operating systems include Android, Windows, BlackBerry OS, or Mac OS (trade names).

Still in this example, the second operating system 81, sometimes referred to as a "trusted operating system" is protected against software attacks. Only applications coming from approved suppliers are installed and executed on the second operating system 81. The second operating system 81 is capable of controlling its application programming interfaces in secure manner as to protect itself against software attacks coming from the first operating system 80. By way of example, it may comply with the "TEE Protection Profile" version 1.0 standard as defined by the GlobalPlatform Organization, and in this example it has encryption means and memory that is dedicated thereto.

Each operating system is associated with an execution environment, referred to herein as "rich" for the rich operating system and referred to as "trusted" for the trusted operating system. These two execution environments may be hosted on a common electronic component or chipset and they may share hardware resources or they may have dedicated hardware resources. By way of example, the electronic component may incorporate the so-called "TrustZone" technology developed by ARM, as described in particular in the document "ARMv7-M Architecture Reference Manual". The term "resource" is used for example to mean the memories 82, 84, and 86, and the man/machine interface 30 as mentioned above, or indeed the processor and a data bus.

By way of example, a processor may have a trusted zone that is controlled by and dedicated to the trusted operating system, and a rich zone that is dedicated to the rich operating system. The volatile and non-volatile memories 82, 84, and 86 in this example are shared in reading and in writing by both operating systems 80 and 81. Alternatively, each operating system may have volatile and/or non-volatile memories dedicated thereto, possibly with non-volatile memory zones that are shared for reading and writing by the two operating systems. By way of example, the two operating systems may communicate with each other via one or more registers that are read by the operating system that is active.

In a particular implementation, the first processor unit 80 operates as a rich operating system (OS) while the second processor unit 81 operates as a TEE OS. In one particular situation, when one of the two operating systems (TEE or Rich) is in operation, the other is inactive (e.g. on standby) so as to ensure exclusive access to the resources (screen, keyboard, memory, . . . ) of the terminal T3. This exclusivity for one or the other of the two operating systems guarantees a good level of security when performing the invention.

The terminal T3 may also have a secure element, e.g. in the form of a removable microcircuit card, or in the form of a microcircuit soldered onto the printed circuit of the terminal T3, but distinct from the main processor of the terminal T3. A secure element generally complies with the ISO/IEC 7816 standard, with the "Common Criteria" standards, and/or with the "GlobalPlatform Card Specification v 2.2.1". It provides strong hardware and software security, as defined for example in those standards. In a particular implementation, the second processor unit 81 is contained in such a secure element.

As shown in FIG. 15, the first processor unit 80 performs the steps A2, A4, A6, and A8 as described above with reference to the first and second implementations.

Once the secure data DS has been determined (A8), the first processor unit 80 sends (A70) it to the second processor unit 81.

After receiving (C70) the secure data DS, the second processor unit 81 determines (C72) the item of sensitive text data DTS from this secure data DS, in a manner analogous to step C42.

Thereafter, the second processor unit 81 triggers (C74) the display of the item of sensitive text data DTS in a manner analogous to step C20 (e.g. using display means included in the man/machine interface 90).

Figure 16:
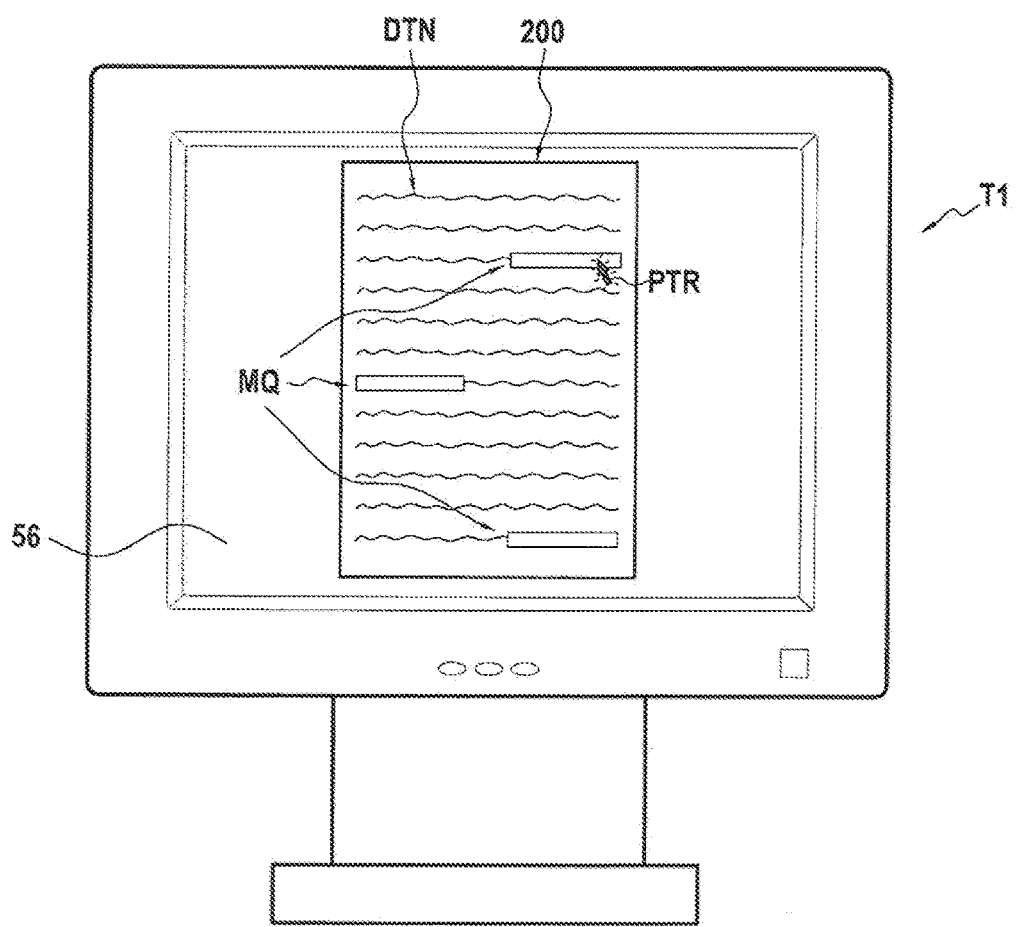
FIG. 16 shows a particular implementation of a pointer that can be used to perform the step of selecting the marker of the invention.

FIG. 16 shows another particular implementation in which the user can select one or more markers MQ present in the secure document 200 by means of a pointer PTR that can be seen while the document 200 is being displayed (on the screen of the terminal T1 in this example).

More precisely, in this example, the marker MQ is selected by means of the pointer PTR which can be seen during the display performed by the first terminal and which can be controlled by the user making use of the man/machine interface 30 of the first terminal T1. The pointer is configured to change its visual appearance during said display when it enters into a region of the secure electronic document 200 that corresponds to one of said marker MQ (e.g. when the pointer is positioned on a marker MQ).

It is thus easier for the user to identify the 15 markers MQ in the secure document, in particular when it includes a large number of items of text data or when the markers cannot easily be seen by the user.

The invention claimed is:

1. A processing method performed by a system comprising a first processor unit in a first terminal, a second processor unit in a remote authentication server, and a third processor unit in a mobile telephone, to enable a user to access sensitive text data from a secure electronic document, the method comprising:
   a) the first processor unit obtaining the secure electronic document;
   b) the first processor unit triggering a display of the secure electronic document on the first terminal;
   c) the user selecting at least one marker that is contained in said secure electronic document and that is viewable by the user on a display of the first terminal, wherein:
      each marker of the at least one marker comprises a first identifier and a machine-readable code, and
      the at least one marker is selected by said third processor unit under user control when the at least one marker displayed on the first terminal is viewed by a camera device in the mobile telephone controlled by the third processor unit;
   c') sending, by the third processor unit, the at least one selected marker to the second processor unit;
   d) on the basis of said at least one received marker, determining, by said second processor unit, secure data from which it is possible to recover at least one item of sensitive text data, wherein said secure data is recovered from outside said secure electronic document;
   f) the second processor unit determining said at least one item of sensitive text data for viewing from said secure data and transmitting determined data to the third processor unit, wherein the second processor unit transmitting the determined data to the third processor unit comprises:
      the first processor unit searching in a vicinity of the first terminal using wireless communication means;
      the first processor unit receiving a second identifier of the mobile telephone when it is in a detection field of the wireless communication means; and
      the first processor unit transmitting the second identifier to the remote authentication server, wherein the second processor unit identifies the mobile telephone to which the determined data is to be transmitted on the basis of the second identifier;
   g) the third processor unit obtaining said at least one item of sensitive text data; and
   h) the third processor unit triggering a display of said at least one item of sensitive text data.

2. A method according to claim 1, wherein the obtaining step a) further comprises: the first processor unit receiving the secure electronic document from outside said first terminal.

3. A method according to claim 1, wherein the secure data is a third identifier, and wherein said at least one item of sensitive text data is determined in step f) from a file that is accessible to said second processor unit, said file comprising at least one identifier in association with said at least one item of sensitive text data.

4. A method according to claim 1, wherein the secure data comprises the at least one item of sensitive text data in encrypted form, said determination in step f) comprising decrypting said secure data in order to deduce said at least one item of sensitive text data therefrom.

5. A method according to claim 1, wherein the third processor unit selects each of the at least one marker viewed by means of said camera device for a determined duration continuously.

6. A method according to claim 1, wherein the determined data comprises the at least one item of sensitive text data encrypted using a first cryptographic key, the at least one item of sensitive text data being obtained by the third processor unit in step g) by decrypting said determined data using a second cryptographic key matching said first cryptographic key.

7. A method according to claim 1, wherein the selection step c) is performed by means of a pointer that can be seen in the display of step b) on the first terminal, and that can be controlled by the user by means of an interface of the first terminal, said pointer being configured to change its visual appearance during said display when it enters a region of the secure electronic document that corresponds to said at least one marker.

8. A method according to claim 1, including the following steps before the obtaining step a) which steps are performed by a fourth processor unit:
   i) obtaining an initial electronic document;
   j) determining in said initial electronic document the at least one item of sensitive text data that is to be made secure;
   k) generating the secure data from said at least one item of sensitive text data; and
   l) processing said initial electronic document in order to obtain the secure electronic document by including in the initial electronic document the at least one marker associated with said secure data, and by deleting or masking the at least one item of sensitive text data.

9. A method according to claim 8, wherein said processing step l) further comprises including said secure data in the initial electronic document.

10. A method according to claim 8, wherein said determination step j) comprises:

displaying said initial electronic document; and the fourth processor unit, under the control of a user, selecting the at least one item of sensitive text data that is to be made secure.

11. A method according to claim 8, wherein the initial electronic document comprises a sequence of successive items of text data in a determined order, the at least one marker being inserted by the fourth processor unit into the initial electronic document during said processing step l) such that when the secure electronic document is displayed in step b), the at least one marker replaces said at least one item of sensitive text data in said sequence of successive items of text data.

12. A method according to claim 8, wherein the processing of step l) further comprises: deleting or masking, in the secure electronic document, at least 70% of text data initially contained in the initial electronic document.

* * * * *